(12) United States Patent
Musha et al.

(10) Patent No.: US 7,405,392 B2
(45) Date of Patent: Jul. 29, 2008

(54) OPTICAL ROTARY ENCODER

(75) Inventors: Takeshi Musha, Tokyo (JP); Toru Oka, Tokyo (JP); Yoichi Ohmura, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 5 days.

(21) Appl. No.: 10/599,142

(22) PCT Filed: Mar. 29, 2005

(86) PCT No.: PCT/JP2005/005822

§ 371 (c)(1),
(2), (4) Date: Sep. 21, 2006

(87) PCT Pub. No.: WO2005/095898

PCT Pub. Date: Oct. 13, 2005

(65) Prior Publication Data

US 2007/0272840 A1    Nov. 29, 2007

(30) Foreign Application Priority Data

Mar. 31, 2004 (JP) .............................. 2004-105679

(51) Int. Cl.
*G01D 5/34* (2006.01)
(52) U.S. Cl. .............................. 250/231.13; 250/237 G; 250/237 R; 356/615
(58) Field of Classification Search ................................
250/231.13–231.18, 237 R, 237 G; 356/615–619
See application file for complete search history.

(56) References Cited

U.S. PATENT DOCUMENTS 6,713,756 B2 * 3/2004 Yamamoto et al. ...... 250/231.13

FOREIGN PATENT DOCUMENTS

| JP | 58-106717 U | 7/1983 |
| JP | 60-515 U | 1/1985 |
| JP | 60-102520 U | 6/1985 |
| JP | 6-294666 | 10/1994 |
| JP | 2002-340623 | 11/2002 |

* cited by examiner

*Primary Examiner*—Seung C Sohn
(74) *Attorney, Agent, or Firm*—Leydig, Voit & Mayer, Ltd.

(57) ABSTRACT

An optical encoder includes: a rotary slit plate having a rotation angle detection track including an optical slit; a light source for applying light to the optical slit; light detecting elements for rotation angle detection and arranged at positions to which light emitted from the light source is applied to the optical slit, to detect the light emitted from the light source and passing through the optical slit; and light detecting elements for light amount monitoring arranged at locations on a circumference in corresponding relationship with positions to which light emitted from the light source is applied to the optical slit, to detect the light emitted from the light source and passing through the optical slit. The light detecting elements for light amount monitoring have an angular width that is an integer multiple of the angular interval of the light intensity distribution on surfaces of the light detecting elements for light amount monitoring.

7 Claims, 11 Drawing Sheets

OPTICAL ROTARY ENCODER

TECHNICAL FIELD

The present invention relates to an optical rotary encoder, and more particularly, to the stabilization of a light amount monitoring signal of this optical rotary encoder.

BACKGROUND ART

An optical rotary encoder generally has a light source; a rotary slit plate which is attached to a motor and is provided with a rotation angle detection tracks formed by optical slits for converting light emitted from the light source into pulsed light; and rotation angle detection light receivers responsible for the photoelectric conversion of the pulsed light thereby formed. The rotation angle detection light receivers have light receiving patterns with a pitch corresponding to the pitch of the optical slit. The rotation angle detection light receivers convert light emitted from the light source and modulated by the optical slits into electric signals, and observe the electric signals thereby converted to detect the rotation angle of the motor.

This type of optical rotary encoder is intended to monitor variations of the light amount of the light source without increasing the outer dimensions of the rotary slit plate and without sacrificing the output of a rotation angle detection signal. As an example, patent publication 1 titled "Absolute Encoder" discloses in its claims an optical absolute encoder including: a rotary slit plate with rotational position detection tracks (rotation angle detection tracks) made of optical slits; light emitting elements (light sources) for emitting light; a fixed slit plate with rotational position detection slits corresponding to the rotational position detection tracks and with light amount monitoring slits for monitoring the light amounts from the light emitting elements; light receiving elements for rotational position detection that are arranged in corresponding relationship with the rotational position detection slits; and light receiving elements for light amount monitoring arranged in corresponding relationship with the light amount monitoring slits. In this optical absolute encoder, the light amount monitoring slits of the fixed slit plate are arranged in a circumferential direction in corresponding relationship with the rotational position detection tracks of the rotary slit plate, and some of the rotational position detection tracks are also operative to function as light amount monitoring tracks. It is also disclosed that the width (angular width) of the light amount monitoring slits in the circumferential direction is an integral multiple of the pitch (angular interval) of the optical slits constituting the rotational position detection tracks that also serve as the light amount monitoring tracks.

Patent Publication 1: Japanese Patent Application Laid-Open No. 6-294666

DISCLOSURE OF THE INVENTION

Problems to be Solved by the Invention

According to the above-described structure of the conventional optical rotary encoder, when the relative position of a motor axis and the rotary slit plate, and the relative position of the optical slits on the rotary slit plate and a light amount monitoring pattern of the light receivers are suitably adjusted, the width of the light amount monitoring slits in the circumferential direction is controlled to be an integral multiple of the pitch of the optical slits constituting the rotational position detection tracks. In this case, no variation of a light amount monitoring signal occurs so that a constant signal strength with respect to the rotation of the rotary slit plate is continuously provided.

However, when there is an error generated at the stage of assembly, adjustment and the like such as deviation of the relative position of the motor axis and the rotary slit plate (deflection of the rotary slit plate) or deviation of the relative position of the pattern of the optical slits on the rotary slit plate and the light amount monitoring pattern of the light receivers, the width of the light amount monitoring slits in the circumferential direction deviates from an integral multiple of the pitch of the optical slits constituting the rotational position detection tracks. In this case, the sinusoidal variation of a light amount monitoring signal occurs with the rotation of the rotary slit plate, failing to provide a stable signal. It is thus impossible to know whether the variation of the light amount monitoring signal results from an error generated at the stage of assembly, adjustment and the like, or from the variation of the light emission intensity of the light source. As a result, the light amount monitoring signal becomes inoperative to perform its function.

The above-described deviation from an integral multiple of the pitch depends on the ratio of the amount of deviation (amount of error) of each relative position to a distance from the rotation axis of the rotary slit plate to the light amount monitoring pattern (radius of the rotation angle detection tracks). Thus, the amount of deviation from an integral multiple of the pitch is increased, especially when this radius of the rotation angle detection tracks is reduced to downsize the encoder. In this case, the sinusoidal variation has a growing influence. Accordingly, even when the rotation angle detection tracks are also operative to serve as light amount monitoring tracks to downsize the rotary slit plate and the entire structure of the device as in the above-described conventional technique, a constant signal strength cannot be continuously provided without any preparation for the above-mentioned error generated at the stage of assembly.

The present invention has been made to solve the above-described problems of the conventional art. It is an object of the present invention to provide a downsized optical rotary encoder with a high degree of detection accuracy capable of stabilizing a light amount monitoring signal even on the occurrence of an error at the stage of assembly, adjustment and the like.

Means to Solve the Problems

An optical encoder according to the present invention includes: a rotary slit plate having a rotation angel detection track formed by an optical slit; a light source for applying light to the optical slit; light receiving elements for rotation angle detection arranged in corresponding relationship with positions to which light emitted from the light source is applied to the optical slit, thereby receiving the light emitted from the light source through the optical slit; and light receiving elements for light amount monitoring arranged at several locations on a circumference in corresponding relationship with positions to which light emitted from the light source is applied to the optical slit, thereby receiving the light emitted from the light source through the optical slit. In this optical rotary encoder, the light receiving elements for light amount monitoring have an angular width that is an integral multiple of the angular interval of the intensity distribution, on surfaces of the light receiving elements for light amount monitoring, of light emitted from the light source and passed through the optical slit.

Effect of the Invention

According to the present invention, the rotation angle detection track is also operative to serve as a light amount monitoring track, thereby realizing downsizing of the device. Further, the light receiving elements for light amount monitoring have an angular width in a circumference direction that is controlled to be an integral multiple of the angular interval of the intensity distribution of light emitted from the light source and passed through the optical slit on surfaces of the light receiving elements for light amount monitoring. (In other words, the light receiving elements for light amount monitoring are designed to have an angular width that corresponds to an integral multiple of the pitch of the optical slit). This allows suppression of the pulsation of a light amount monitoring signal.

An error generated at the stage of assembly, adjustment and the like exerts greater influence as a result of downsizing of the entire structure of the device, leading to greater sinusoidal variation of the strength of a light amount monitoring signal. In response, light receiving elements for light amount monitoring are arranged at several locations on a circumference. This reduces the above-mentioned influence of an error generated at the stage of assembly, adjustment and the like.

Thus, a downsized optical rotary encoder with a high degree of detection accuracy can be provided that is capable of stabilizing a light amount monitoring signal even on the occurrence of an error generated at the stage of assembly, adjustment and the like.

Explanation of Reference Numerals

BEST MODE FOR CARRYING OUT THE INVENTION

First Embodiment

Figure 1:
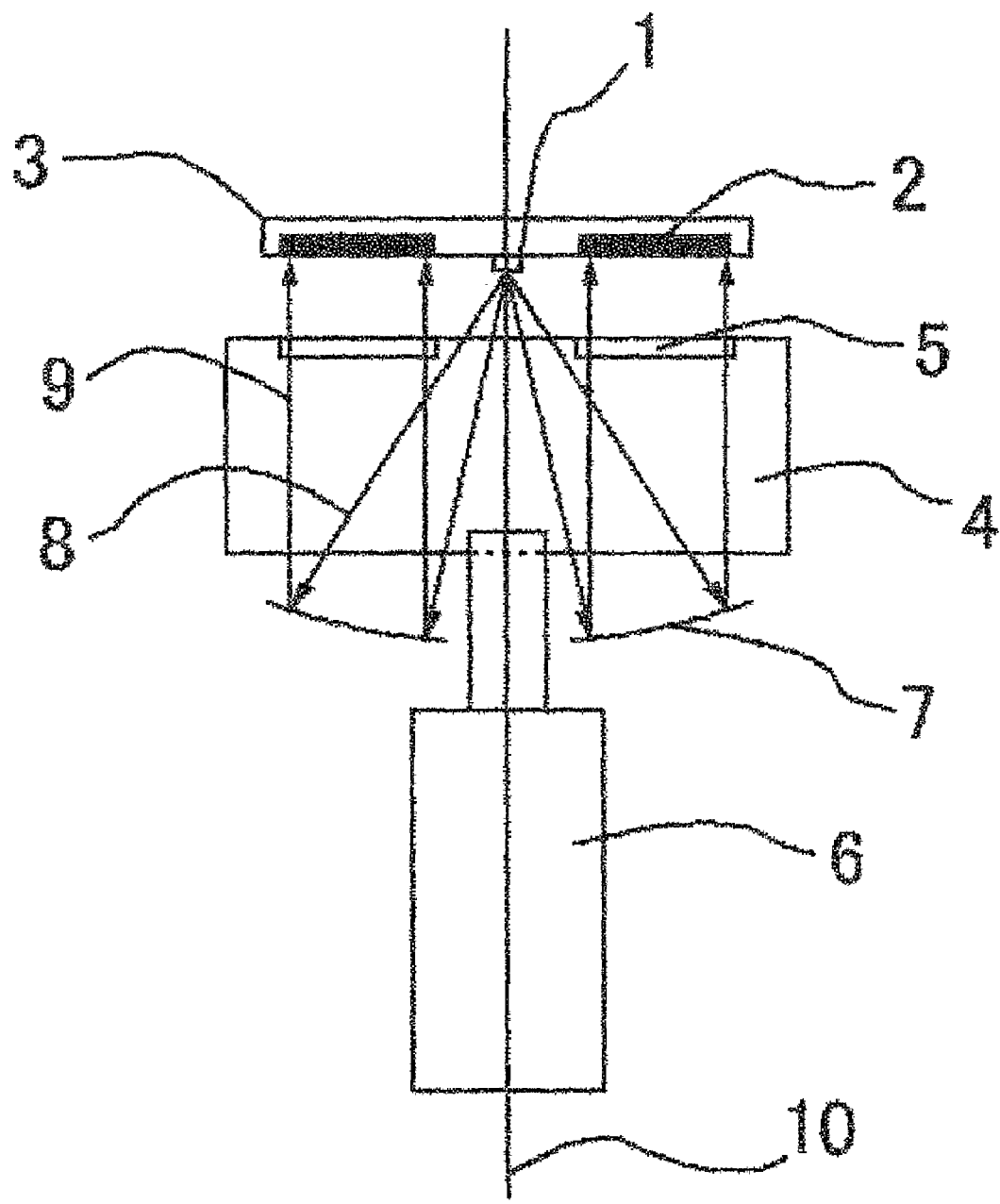
FIG. 1 is a sectional view showing the overall structure of an optical rotary encoder according to a first embodiment of the present invention.
Figure 2:
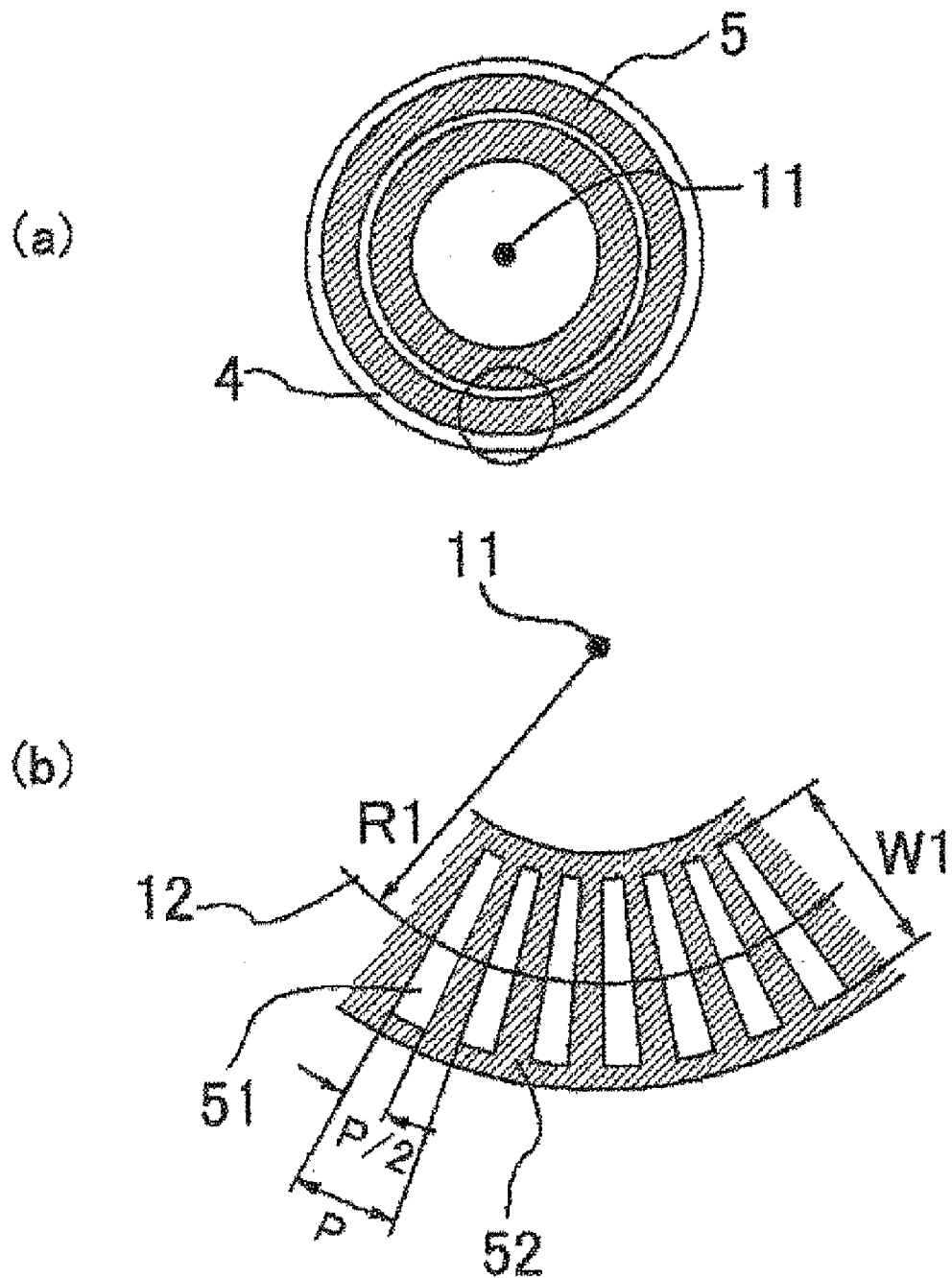
FIG. 2 shows the structure of a rotary slit plate shown in FIG. 1, constituted by a plan view of FIG. 2(a) showing this rotary slit plate in its entirety, and a plan view of FIG. 2(b) showing a part of the structure of FIG. 2(a) in an enlarged manner.
Figure 3:
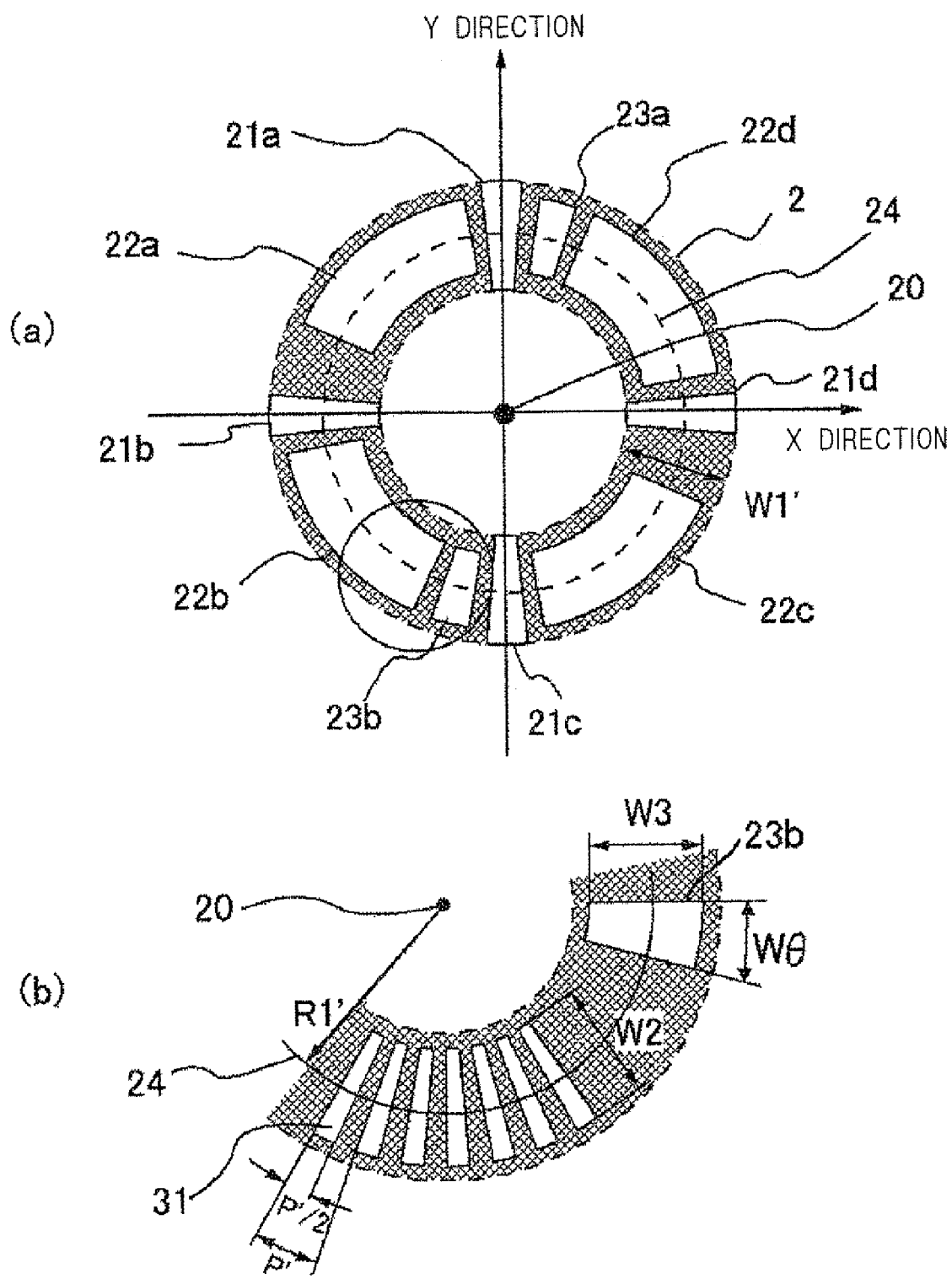
FIG. 3 shows the structure of a light receiving element group, constituted by a plan view of FIG. 3(a) showing this light receiving element group in its entirety, and a plan view of FIG. 3(b) showing a part of the structure of FIG. 3(a) in an enlarged manner.

FIGS. 1, 2 and 3 shows the structure of an optical rotary encoder according to a first embodiment of the present invention. FIG. 1 is a sectional view of the overall structure. FIG. 2(a) is a plan view of a rotary slit plate, and FIG. 2(b) is a plan view showing a part (circled part) of the structure of FIG. 2(a) in an enlarged manner. FIG. 3(a) is a plan view of a light receiving element group, and FIG. 3(b) is a plan view showing a part (circled part) of the structure of FIG. 3(a) in an enlarged manner.

A rotary slit plate 4 is attached to a motor axis 6. The rotary slit plate 4 has a rotation angle detection track 5 (indicated by hatching in FIG. 2(a)) made of an optical slit in which a plurality of optically transparent portions 51 and optically non-transparent portions 52 are arranged on a circumference.

Light 8 emitted from a light source 1 is converted by a concave mirror 7 into substantially parallel light beams 9. The substantially parallel light beams 9 are guided to the entire circumference of the optical slit of the rotation angle detection track 5 provided to the rotary slit plate 4. The light having passed through this optical slit (light having passed through the optically transparent portions 51) is received by a light receiving element group 2 provided to a light receiver 3, and is then subjected to photoelectric conversion. At this time, periodic light intensity distribution corresponding to the angular interval of the optical slit is formed on the surface of the light receiver 3. The light receiving element group 2 is arranged according to the angular interval of this light intensity distribution as will be discussed in detail later.

As shown in the partially enlarged view of FIG. 2(b), assuming that a center line 12 of the rotation angle detection track 5 is defined a distance from a center point 11 of a track pattern for rotation angle detection of the rotary slit plate 4 by a radius R1, the optically transparent portions 51 each have a width W1 in a radius direction with the center line 12 of the track as a center. The optically transparent portions 51 and the optically non-transparent portions 52 (indicated by hatching in FIG. 2(b)) are periodically arranged along the same circumference (center line 12 of the rotation angle detection track 5) and at an angular interval (pitch) P. That is, the angular interval (pitch) of the optical slit is P.

The light receiver 3 includes the light receiving element group 2 and the light source 1 opposed to one main surface of the rotary slit plate 4, for example. The light receiving element group 2 has light receiving elements 31 for rotation angle detection, light receiving elements 23a, 23b for light amount monitoring, and light receiving elements 21a to 21d for position monitoring. The light receiving elements 31 for rotation angle detection are provided in rotation angle detection regions 22a to 22d.

In the present embodiment, the light receiving elements 31 for rotation angle detection in the rotation angle detection regions 22a to 22d, the two light receiving elements 23a, 23b for light amount monitoring, and the four light receiving elements 21a to 21d for position monitoring are arranged on the same plane and along the same circumference, and together form a light receiving element track.

In the present invention, the arrangement along the same circumference for example of the optically transparent portion 51 and the optically nontransparent portion 52 means that the center (midpoint) of the optically transparent portion 51 in the radius direction and the center (midpoint) of the optically non-transparent portion 52 in the radius direction are arranged along the same circumference. When the centers of the optically transparent portions 51 in the radius direction and the centers of the optically non-transparent portions 52 in the radius direction are not on the same circumference yet some of the optically transparent portions 51 and some of the optically non-transparent portions 52 are arranged along the same circumference, the optically transparent portions 51 and the optically non-transparent portions 52 are said to be arranged along the circumference. This applies to each of the light receiving elements.

With reference to FIG. 3, assuming that a center line 24 of the light receiving element track is defined a distance from a center point 20 of a track pattern of light receiving elements by a radius R1', the light receiving elements in the light receiving element group 2 is formed on the same circumference with the center line 24 of the light receiving element track as a center (midpoint) in the radius direction.

The structure of the light receiving element group 2 is such that the light receiving elements 31 for rotation angle detection are arranged in the rotation angle detection regions 22a to 22d at a certain angular interval (pitch) P' corresponding to the angular interval (pitch) P of the optical slit (optically transparent portions 51). In other words, periodic light distribution corresponding to the angular interval of the optical slit is formed on the surfaces of the light receiving elements 31 for rotation angle detection, and the light receiving elements 31 for rotation angle detection are arranged according to the angular interval P' of this light intensity distribution. In the present embodiment, parallel light beams are applied to the rotary slit plate 4, and the four rotation angel detection regions 22a to 22d are arranged along the same circumference.

The two light receiving elements 23a and 23b for light amount monitoring are of the same structure, and are evenly spaced along the same circumference as the light receiving elements 31 for rotation angle detection with the center line 24 of the light receiving element track as a center. That is, the two light receiving elements 23a and 23b for light amount monitoring are 180 degrees opposite to each other with respect to the center point 20 of the track pattern of light receiving elements (in other words, the light receiving elements 23a and 23b for light amount monitoring form an angle of 180 degrees therebetween with respect to the center point 20). The center point 20 of the track pattern of light receiving elements coincides with the center point of the circumference along which the light receiving elements 23a and 23b are arranged.

The four light receiving elements 21a to 21b for position monitoring are of the same structure, and are evenly spaced along the same circumference as the light receiving elements 31 for rotation angle detection with the center line 24 of the light receiving element track as a center. That is, the four light receiving elements 21a to 21d for position monitoring are shifted 90 degrees from one another with the center point 20 of the track pattern of light receiving elements as a center. The center point 20 of the track pattern of light receiving elements coincides with the center of a circle forming a circumference (center of a circumference) along which the light receiving elements 21a to 21d are arranged.

The light receiving elements 31 for rotation angle detection each have a width W2 in the radius direction with the center line 24 of the light receiving element track as a center. Reference numeral W1' shown in FIG. 3 indicates the width in the radius direction of a region of the surfaces of the light receiving elements 31 for rotation angle detection to which light emitted from the light source 1 and passed through the optical slit (optically transparent portions 51) is applied. In FIG. 3, hatching represents the region of the surfaces of the light receiving elements 31 for rotation angle detection to which light emitted from the light source 1 and passed through the optical slit (optically transparent portions 51) is applied. The width W1' is determined in corresponding relationship with the width W1 of the optically transparent portions 51 in the radius direction shown in FIG. 2. A relation W1=W1' is established when parallel light beams are applied to the rotary slit plate 4. At this time, the widths W2 and W1' are set so that a relation W1'>W2 is established. This prevents the reduction of the signal strength of the light receiving elements 31 for rotation angle detection even on the occurrence of an error at the stage of assembly, adjustment and the like.

A relation R1=R1' is established when parallel light beams are applied to the rotary slit plate 4.

In FIG. 3, in order to continuously obtain a signal with constant strength irrespective of the rotation of the rotary slit plate 4, each angular width in a circumferential direction of the light receiving elements 23a, 23b for light amount monitoring and the light receiving elements 21a to 21d for position monitoring is set to satisfy the following relation:

angular width=$P-'\times$integer where P' is the angular interval of the light receiving elements 31 for rotation angle detection. In other words, the angular width of the light receiving elements 23a and 23b for light amount monitoring (angular width in the circumferential direction represented for example as W$\theta$ in FIG. 3(b)) is an integral multiple of the angular interval of the intensity distribution of light emitted from the light source 1 and passed through the optical slit (optically transparent portions 51) on the surfaces of the light receiving elements 23a and 23b for light amount monitoring. The angular width of the light receiving elements 21a to 21d for position monitoring (angular width in the circumferential direction) is an integral multiple of the angular interval of the intensity distribution of light emitted from the light source 1 and passed through the optical slit (optically transparent portions 51) on the surfaces of the light receiving elements 21a to 21d for position monitoring.

The ideal arrangement of the rotary slit plate 4 is such that the center point 11 of the track pattern for rotation angle detection on the rotary slit plate 4 and the center point 20 of the track pattern of light receiving elements are both on a rotation axis 10 of the rotary slit plate 4. However, due to an error generated at the stage of assembly, adjustment and the like, deviation (deflection) of the center point 11 of the track pattern for rotation angle detection from the rotation axis 10 of the rotary slit plate, and positional deviation between the center point 11 of the track pattern for rotation angel detection and the center point 20 of the track pattern of light receiving elements may be generated. In this case, the center line 12 of the rotation angel detection track 5 and the center line 24 of the light receiving element track do not coincide with each other, failing to satisfy the condition of an integral multiple of P'. Hence signals from the light receiving elements 23a and 23b for light amount monitoring (monitoring signals) are not always kept constant with respect to the rotation of the rotary slit plate 4, but sinusoidally vary with respect to a rotation angle.

Figure 4:
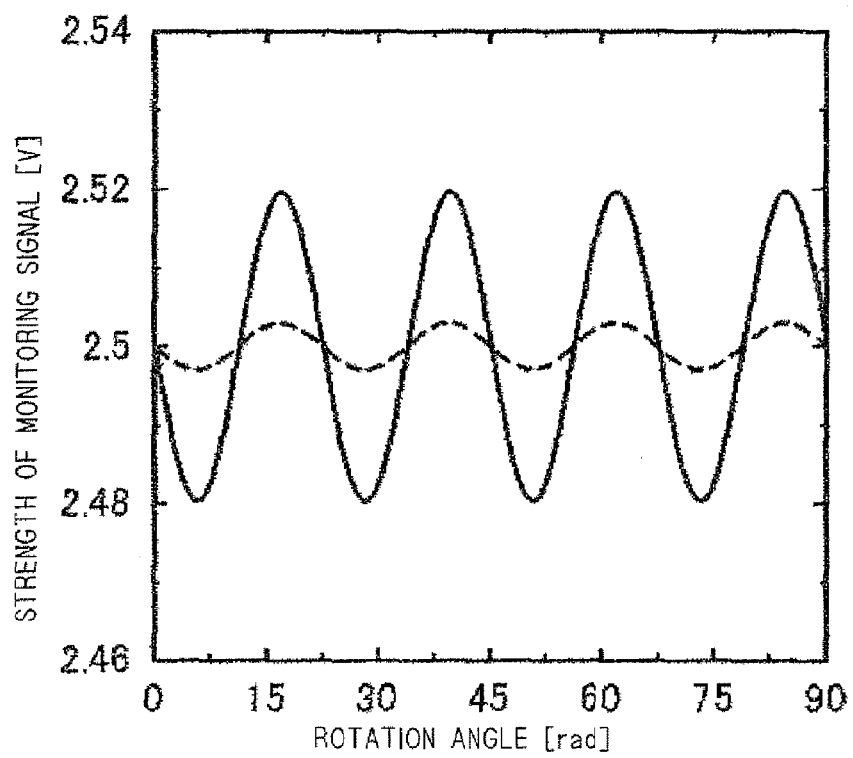
FIG. 4 is a characteristic graph according to the first embodiment of the present invention, showing the influence of the radius of a rotation angle detection track upon the sinusoidal variation of a light amount monitoring signal.
Figure 5:
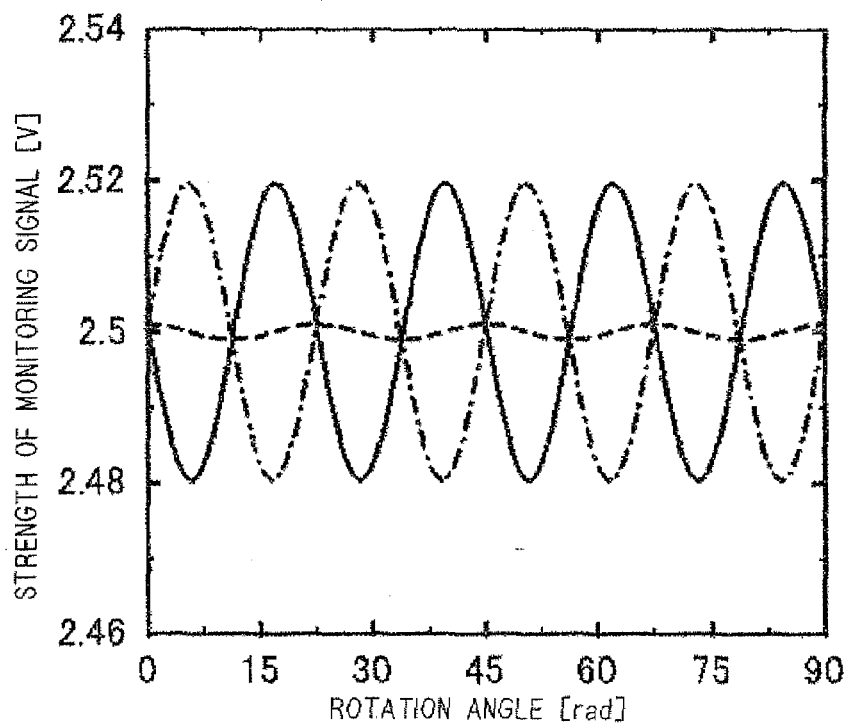
FIG. 5 is a characteristic graph according to the first embodiment of the present invention, showing light amount monitoring signals sent from two light receiving elements for light amount monitoring.

FIGS. 4 and 5 give specific examples of such sinusoidal variation, showing monitoring signals that are obtained when the center point 11 of the track pattern for rotation angle detection on the rotary slit plate 4 deviates from the center point 20 of the track pattern of light receiving elements by 50 μm, for example. In FIGS. 4 and 5, each horizontal axis shows the rotation axis of the rotary slit plate, and each vertical axis shows the strength of monitoring signals.

With reference to FIG. 4, dashed and solid lines show monitoring signals given from the light receiving element 23a for light amount monitoring when the radius R1 =R1'=20 mm and when the radius R1=R1'=3 mm, respectively. As shown in FIG. 4, the sinusoidal variation of light amount monitoring signals on the occurrence of deflection or adjustment error is considerably large with the reduction of a radius of the center line 12 of the rotation angel detection track of the rotary slit plate 4, namely, with the reduction of the radius of the rotary slit plate 4 as a whole.

FIG. 5 shows monitoring signals given from the light receiving elements 23a and 23b for light amount monitoring when the radius R1=R1'=3 mm. With reference to FIG. 5, a solid line shows a monitoring signal from one light receiving element 23a for light amount monitoring, and an alternate long and short dashed line shows a monitoring signal from the other light receiving element 23b for light amount monitoring. As seen from FIG. 5, on the occurrence of deflection or adjustment error, signals from the light receiving elements 23a and 23b for light amount monitoring that are 180 degrees opposite to each other with respect to the center point 20 of the track pattern of light receiving elements (center point of a circumference along which the light receiving elements 23a and 23b for light amount monitoring are arranged) form sinusoidal waves that are phase shifted 180 degrees. Thus by summing up these two signals, a monitoring signal indicated by a broken line in FIG. 5 is obtained that is reduced in sinusoidal variation.

With reference to FIG. 3, the light receiving elements 23a and 23b for light amount monitoring each have a width W3 in the radius direction with the center line 24 of the light receiving element track as a center. The following relation is established between the widths W3 and W1':

$$W1' > W3$$

That is, both ends of the light receiving elements 23a and 23b for light amount monitoring in the radius direction are arranged to be within the width dimension in the radius direction of the region of the surfaces of the light receiving elements 23a and 23b for light amount monitoring to which light emitted from the light source 1 and passed through the optical slit (optically transparent portions 51) is applied (indicated by hatching in FIG. 3). Thus, even on the occurrence of an error at the stage of assembly, adjustment and the like, a monitoring signal with a constant strength can be detected without being influenced by the optically non-transparent portions 52 defined between the optically transparent portions 51 and at both ends in the radius direction of the optically transparent portions 51 of the rotation angle detection track 5.

Due to an error generated at the stage of assembly, adjustment and the like, deviation (deflection) of the center point 11 of the track pattern for rotation angle detection from the rotation axis 10 of the rotary slit plate, positional deviation between the center point 11 of the track pattern for rotation angel detection and the center point 20 of the track pattern of light receiving elements and the like may be generated. When a total amount of error 6 resulting from these deviations is expressed as:

$$\epsilon > (W1' - W3)/2,$$

a monitoring signal is influenced by the above-mentioned positions of the optically non-transparent portions 52 of the rotation angle detection track 5. Thus, this total amount of error E at the stage of assembly, adjustment and the like desirably satisfies the following condition:

$$\epsilon \leq (W1' - W3)/2,$$

so that the light receiving elements 23a and 23b for light amount monitoring are always within the region irradiated with light.

As discussed above, the light receiving elements 23a and 23b for light amount monitoring are so arranged to form an angle of 180 degrees therebetween with respect to the center point 20 of the circumference along which the light receiving elements 23a and 23b for light amount monitoring are arranged. In this case, the sinusoidal variation of a light amount monitoring signal generated by an error at the stage of assembly, adjustment and the like is most effectively reduced. Thus at least two light receiving elements for light amount monitoring that are 180 degrees opposite to each other are required. However, as seen from the graph indicated by a broken line of FIG. 5 that is formed by summing up monitoring signals from the light receiving elements 23a and 23b for light amount monitoring, slight sinusoidal components still remain though sinusoidal variation is considerably reduced. In the example of FIG. 5, the deviation between the rotary slit plate 4 (rotation angel detection track 5) and the light receiver 3 (light receiving element track) is set to 50 μm. A larger amount of deviation results in greater sinusoidal components of the graph formed by summing up monitoring signals from the light receiving elements 23a and 23b for light amount monitoring (indicated by a broken line in FIG. 5). In this case, two or more pairs of light receiving elements for light amount monitoring 180 degrees opposite to each other may be provided to thereby realize a higher degree of effectiveness in reducing sinusoidal variation.

With reference to FIG. 3, the light receiving elements 21a to 21d for position monitoring each have the width W1' in the radius direction with the center line 24 of the light receiving element track as a center. A relation W1=W1' is established when parallel light beams are applied to the rotary slit plate 4. The width in the radius direction of the light receiving elements 21a to 21d for position monitoring is set to be the same as the width W1' in the radius direction of the distribution of light emitted from the light source 1 and passed through the optical slit (optically transparent portions 51) on the surfaces of the light receiving elements 21a to 21d for position monitoring. Accordingly, when there is deviation between the rotary slit plate 4 and the light receiving elements 21a to 21d for position monitoring (light receiving element group 2), the optically non-transparent portions 52 of the rotation angel detection track 5 overlap the light receiving elements 21a to 21d for position monitoring, resulting in the reduction of signal strength.

In this case, by making position adjustment so that the sum of the outputs from the light receiving elements 21a to 21d for position monitoring reaches its maximum, the positional relationship between the rotary slit plate 4 (rotation angle detection track 5) and the light receiver 3 (light receiving element track) can be controlled with a high degree of accuracy.

The outputs from the light receiving elements 21a to 21d for position monitoring arranged at four locations that are shifted 90 degrees from one another with respect to the center point 20 may not be summed up. Alternatively, signal outputs from the light receiving elements 21a to 21d for position monitoring may be independently detected. In this case, it is allowed to know whether the rotary slit plate 4 deviates in X direction or in Y direction from the light receiving elements 21a to 21d (light receiving element group 2), thereby more easily realizing position adjustment with a high degree of accuracy.

As a more specific example, with regard to the respective signals from the light receiving elements 21a to 21d for position monitoring shown in FIG. 3, it is seen that the rotary slit plate 4 deviates from the light receiver 3 in the X direction if the signal strengths of the light receiving elements 21b and 21d for position monitoring are lower than the signal strengths of the light receiving elements 21a and 21c for position monitoring. Adjustment in the X and Y directions is then gradually continued until respective signal outputs from the light receiving elements 21a to 21d for position monitoring reach their maxima that are the same in value. Then the adjustment of the positional relationship between the rotary slit plate 4 and the light receiver 3 is completed.

In the above description, the light receiving elements 21a to 21d for position monitoring arranged at four locations that are shifted 90 degrees from one another with respect to the center point 20. In other words, the light receiving elements 21a and 21c for position monitoring are 180 degrees opposite to each other with respect to the center point 20, and the light receiving elements 21b and 21d for position monitoring are 180 degrees opposite to each other with respect to the center point 20. Then the light receiving elements for position monitoring are 180 degrees opposite to each other with respect to the center point 20 of the circumference along which the light receiving elements for position monitoring are arranged, thereby realizing the same effect as mentioned with reference to the light receiving elements 23a and 23b for light amount monitoring. That is, when the positional relationship between the rotary slit plate 4 and the light receiver 3 is adjusted, the strength of a position monitoring signal varies according to the rotational position of the rotary slit plate 4 due to the fact that the rotation angle detection track 5 is operative to serve both as a track for light amount monitoring or position monitoring and as a track for rotation angle detection. Such variation can be reduced to thereby obtain a stable signal while realizing downsizing of the device. When the positional deviation is generated between the center point 11 of the track pattern for rotation angle detection and the center point 20 of the track pattern for light receiving elements, the positional relationship between the rotary slit plate 4 and the light receiver 3 is adjusted. Especially in this case, the light receiving elements 23a and 23b for light amount monitoring should be so arranged to form an angle of 180 degrees therebetween.

With reference to FIG. 2, the optical slit of the rotary slit plate 4 is formed by the rectangular (more precisely, fan-like) optically transparent portions 51 and the optically non-transparent portions 52 alternately arranged along the same circumference. However, the shape of the optical slit is not limited to this. As an example, the optically non-transparent portions 52 are not required to be completely light shielded. In this case, a slit may have such a shape that the optically transparent portions 51 and the optically non-transparent portions 52 are subjected to strength modulation at a certain ratio and at a certain interval. As an example, a slit may be formed by a series of openings with a sinusoidal shape. Although not specifically discussed, this applies to each embodiment discussed below.

Second Embodiment

Figure 6:
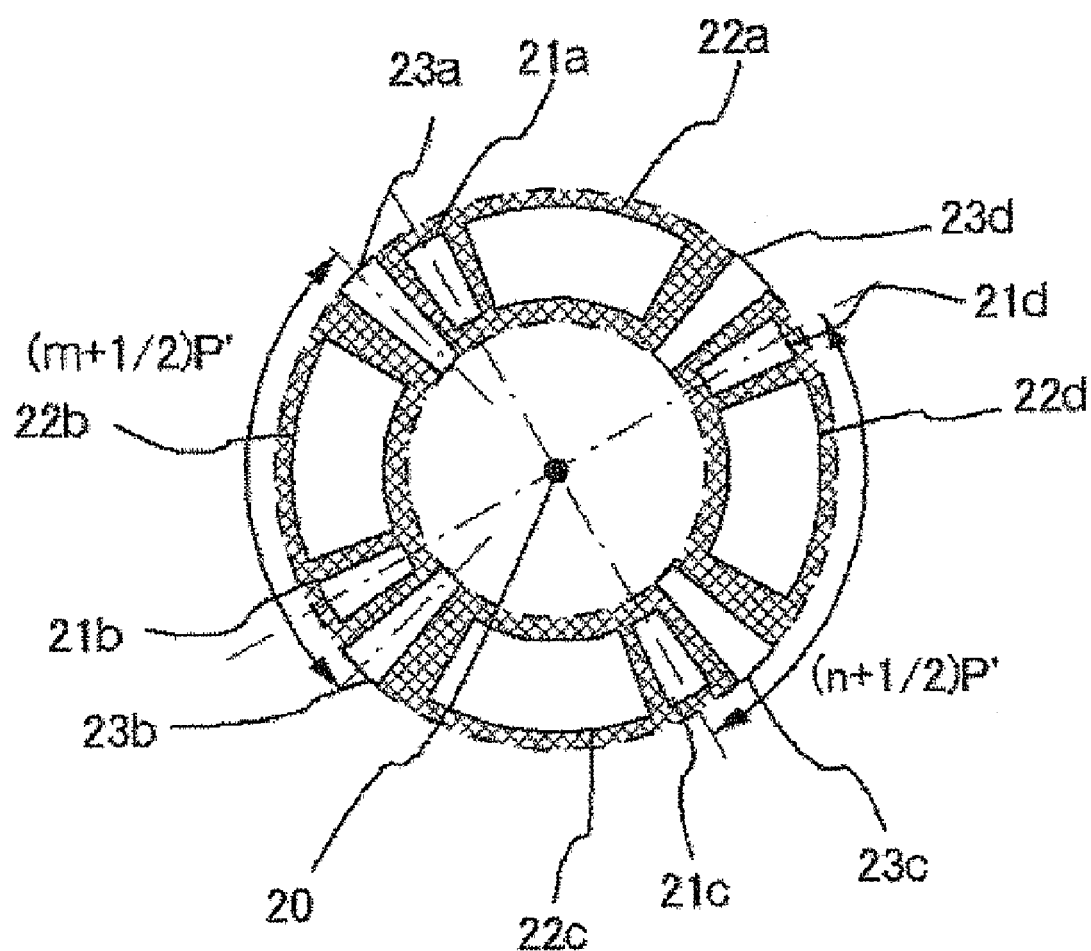
FIG. 6 is a plan view showing the structure of a light receiving element group according to a second embodiment of the present invention.

FIG. 6 shows the structure of an optical encoder according to a second embodiment of the present invention. More specifically, FIG. 6 is a plan view of light receiving elements. The other structures are the same as those of the first embodiment, so in the following description, the difference from the first embodiment will be mainly discussed.

In the first embodiment, the light receiving elements 23a and 23b for light amount monitoring are evenly spaced at two locations along the same circumference as the light receiving elements 31 for rotation angel detection. The light receiving elements 21a to 21d for position monitoring are evenly spaced at four locations along the same circumference as the light receiving elements 31 for rotation angel detection. In the present embodiment, light receiving elements 23a to 23d for light amount monitoring and light receiving elements 21a to 21d for position monitoring are both arranged at four locations along the same circumference as the light receiving elements 31 for rotation angle detection. Further, the light receiving elements for light amount monitoring and the light receiving elements for position monitoring are not evenly spaced. As an example, the light receiving elements 23a and 23c for light amount monitoring, and the light receiving elements 23b and 23d for light amount monitoring are respectively 180 degrees opposite to each other with respect to the center point 20 of the track pattern of light receiving elements. However, the light receiving elements 23a and 23b, and the light receiving elements 23c and 23d are not shifted 90 degrees from each other, but are respectively spaced at an interval of $(m+\frac{1}{2})P'$ where m represents an integer. Namely, the light receiving elements 23a and 23b, and the light receiving elements 23c and 23d are respectively spaced at an interval of (odd number/2)P'. Likewise, the light receiving elements 21a and 21c for position monitoring, and the light receiving elements 21b and 21d for position monitoring are respectively 180 degrees opposite to each other with respect to the center point 20 of the track pattern of light receiving elements. However, the light receiving elements 21a and 21b, and the light receiving elements 21c and 21d are not shifted 90 degrees from each other, but are respectively spaced at an interval of $(n+\frac{1}{2})P'$ where n represents an integer. Namely, the light receiving elements 21a and 21b, and the light receiving elements 21c and 21d are respectively spaced at an interval of (odd number/2)P'.

Next, the effect of the present embodiment will be discussed. With reference to FIG. 1 showing the overall structure of the optical rotary encoder, the light beams 9 reflected from the concave mirror 7 are applied to the rotary slit plate 4 in the form of substantially parallel light beams. In this structure, if the rotary slit plate 4 and the light receiver 3 are properly assembled, each angular width in the circumferential direction of the light receiving elements for light amount monitoring and the light receiving elements for position monitoring is set to satisfy the following condition:

angular width=$P'$×integer where P' is the angular interval of the light receiving elements for rotation angle detection. Then a monitoring signal with no sinusoidal variation can be given. If the rotary slit plate 4 and the light receiver 3 are not properly assembled, a monitoring signal with reduced sinusoidal variation can be given as mentioned in the description of the first embodiment.

Figure 7:
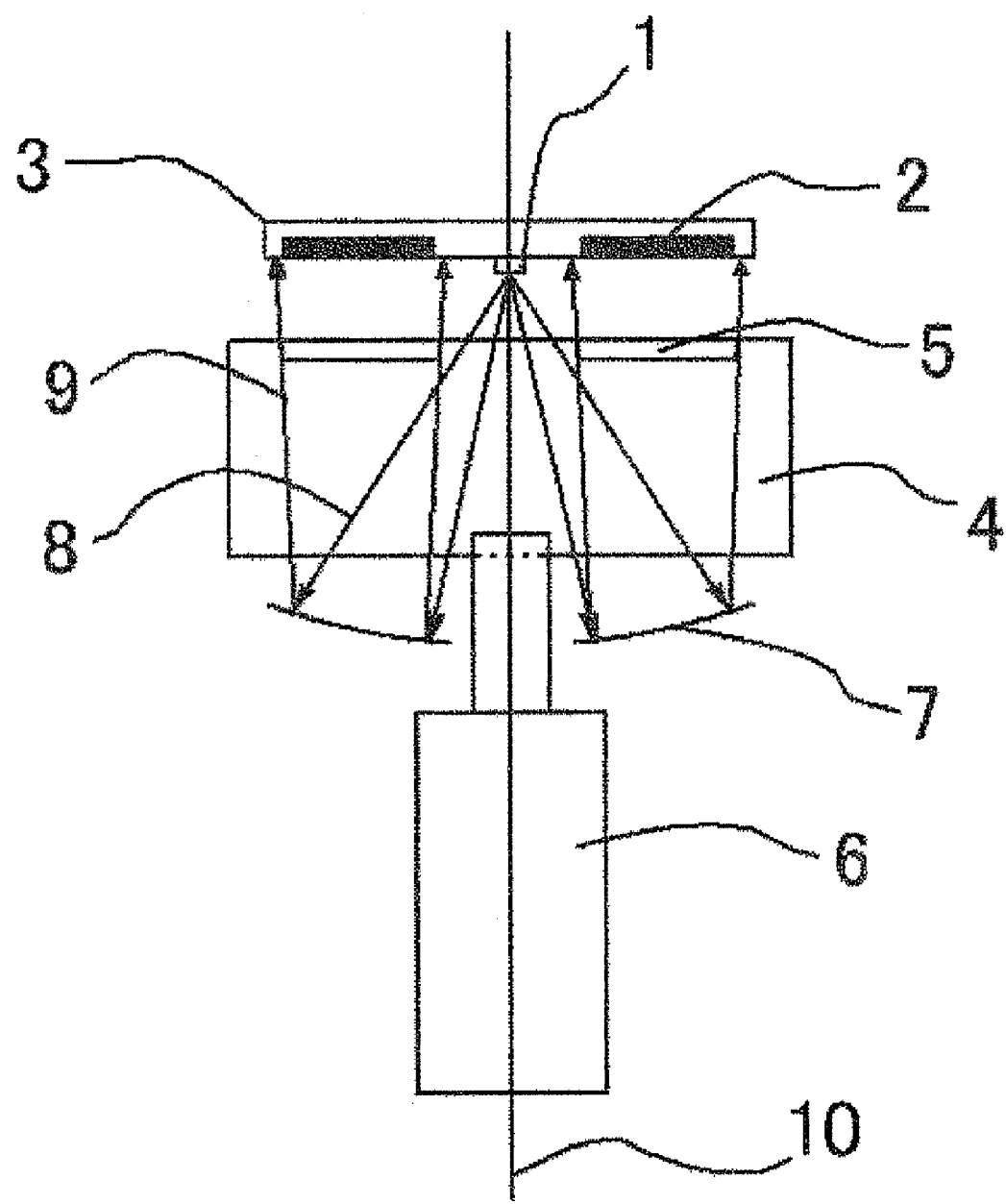
FIG. 7 is a sectional view showing the overall structure of an optical rotary encoder according to the second embodiment of the present invention.

However, if the positional relationship between the light source 1 and the concave mirror 7 are not properly adjusted, the light beams 9 are not reflected from the concave mirror 7 in the form of substantially parallel light beams, but travel outward as shown in FIG. 7. In this case, the same angular interval of the intensity distribution of light is formed on the surface of the light receiving element group 2, whereas the width of the intensity distribution of light in the circumferential direction corresponding to the angular interval is broadened: On the other hand, the defection region of the light receiving element group is not expanded, thereby generating faulty parts That fail to detect signals. Signal components of these faulty parts vary with time by the rotation, and Thus a monitoring signal is given components of sinusoidal variation.

This also applies to the arrangement of light receiving elements of the first embodiment shown in FIG. 3. The light receiving elements 23a and 23b for light amount monitoring 180 degrees opposite to each other, and the light receiving elements 21a to 21d for position monitoring shifted 90 degrees from one another respectively provide sinusoidal components in the same phase. Thus sinusoidal components of a monitoring signal cannot be reduced even by summing up signals from a plurality of light receiving elements.

According to the arrangement of light receiving elements of the present embodiment, the light receiving elements 23a and 23b for light amount monitoring are for example spaced at an interval of $(m+\frac{1}{2})P'$, namely, shifted from each other by a half cycle. Thus, even when the positional relationship between the light source 1 and the concave mirror 7 is not properly adjusted so the light beams 9 reflected from the concave mirror 7 travel outward, signals given from the light receiving elements 23a and 23b for light amount monitoring are in opposite phase with a phase difference of 180 degrees therebetween. Then a monitoring signal formed by summing up the signals from the light receiving elements 23a and 23b for light amount monitoring is stabilized and reduced in sinusoidal component.

The light receiving elements 23a and 23c are 180 degrees opposite to each other. Thus by the same effect as mentioned in the description of the first embodiment, a stable monitoring signal can be given even when the rotary slit plate 4 and the light receiver 3 are not properly assembled.

Likewise, the light receiving elements 21a and 21c for position monitoring, and the light receiving elements 21b and 21d for position monitoring arc respectively 180 degrees opposite to each other with respect to the center point 20 of the track pattern of light receiving elements. The light receiving elements 21a and 21b, and the light receiving elements 21c and 21d are respectively spaced at an interval of $(n+\frac{1}{2})P'$ where n represents an integer. Thus a stable monitoring signal can be given.

In the above-described embodiment, two pairs of light receiving elements for light amount monitoring spaced at an interval of 180 degrees are provided, and these pairs are spaced at an interval of $(m+\frac{1}{2})P'$. When these two pairs of light receiving elements for light amount monitoring are regarded as one set, several sets of light receiving elements for light amount monitoring may be formed. Likewise, several sets of light receiving elements for position monitoring may be formed. In both cases, light receiving elements between the sets may be spaced at an arbitrary interval.

In the above-described embodiment, the light beams 9 reflected from the concave mirror 7 are shown to travel outward. When the reflected light beams 9 travel inward, light receiving elements disadvantageously receive unnecessary signals so that a monitoring signal is given components of sinusoidal variation. In this case, by applying the same structure as in the above-described embodiment, signals given from the light receiving elements 23a and 23b for light amount monitoring are also in opposite phase with a phase difference of 180 degrees therebetween. Then a monitoring signal formed by summing up the signals from the light receiving elements 23a and 23b for light amount monitoring is stabilized and reduced in sinusoidal component, to thereby realize the same effect as mentioned in the above-described embodiment.

Figure 8:
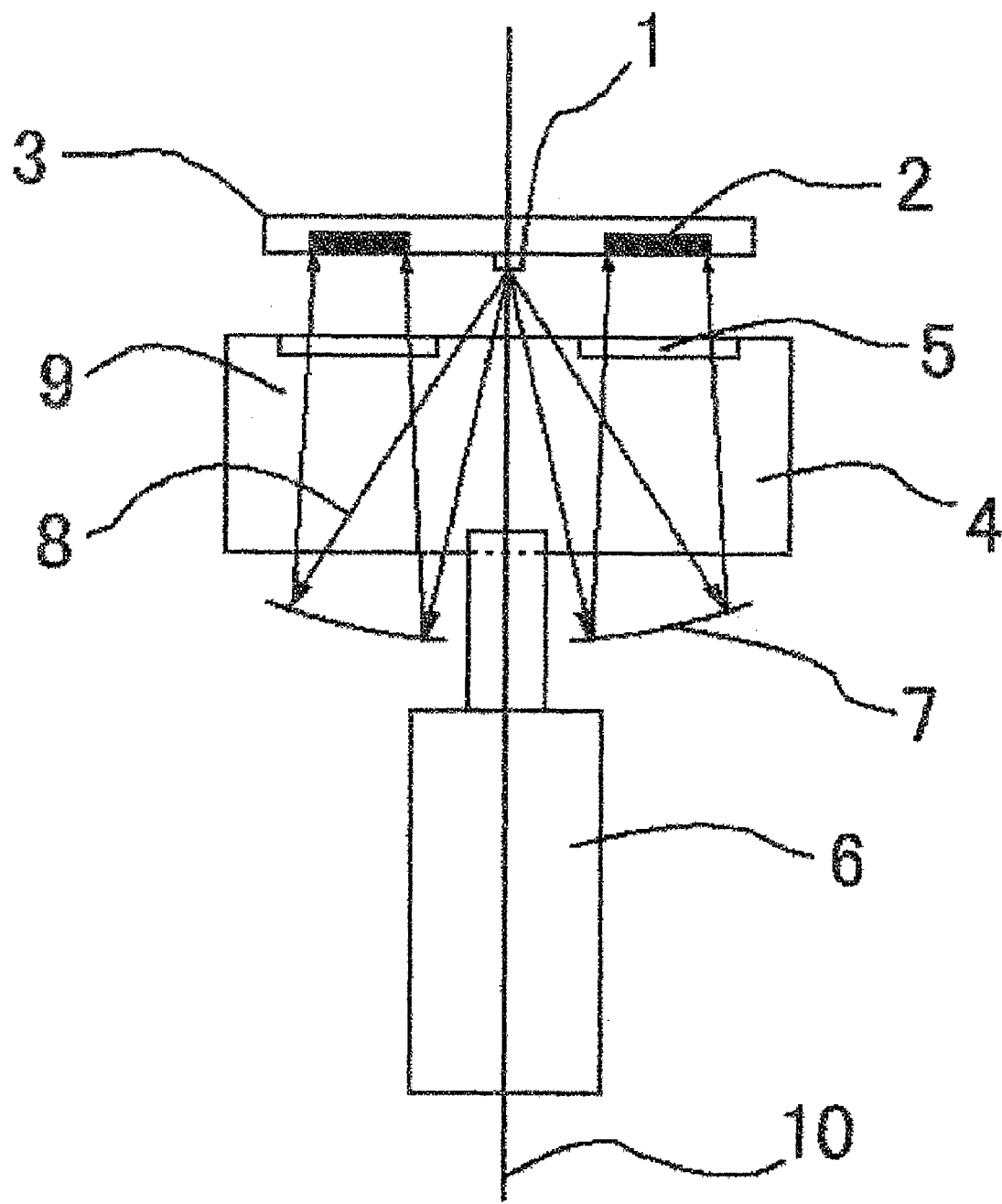
FIG. 8 is a sectional view showing an alternative of the overall structure of the optical rotary encoder according to the second embodiment of the present invention.

When the light beams 9 are not reflected from the concave mirror 7 in the form of substantially parallel light beams in a design stage, the reflected light beams 9 may be designed to travel inward as shown in FIG. 8 with the intention of reducing the area of light receiving elements. In this case, signals to be given to the light receiving elements differ not only on the occurrence of improper assembly of the light source 1 and the concave mirror 7 but also on the occurrence of deviation of the interval between the concave mirror 7 and the rotary slit plate 4. The present embodiment is also effectively applicable to this case.

Third Embodiment

Figure 9:
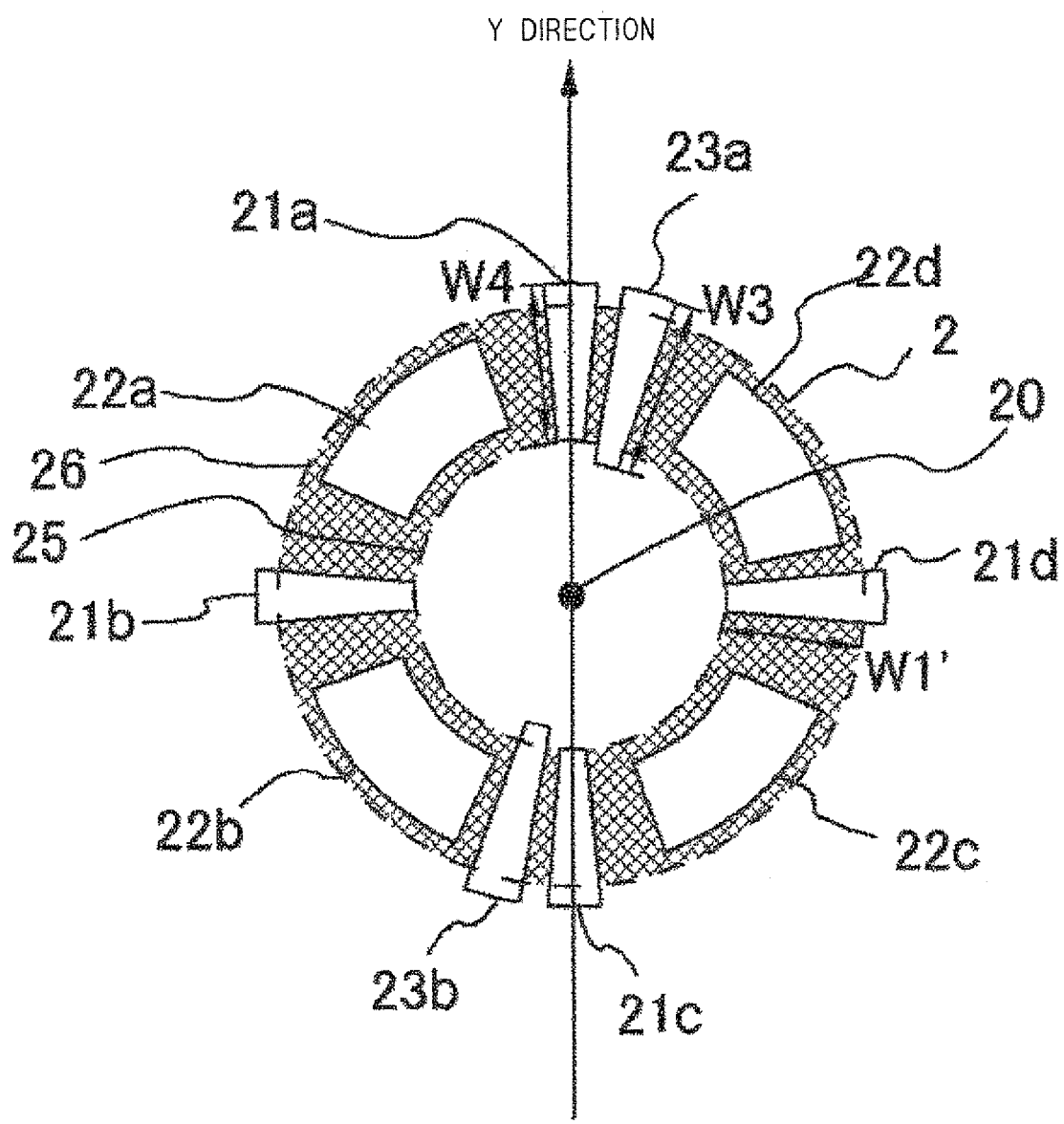
FIG. 9 is a plan view showing the structure of a light receiving element group according to a third embodiment of the present invention.

FIG. 9 shows the structure of an optical rotary encoder according to a third embodiment of the present invention. More specifically, FIG. 9 is a plan view of light receiving elements. The other structures are the same as those of the first embodiment, so in the following description, the difference from the first embodiment will be mainly discussed.

In the first embodiment, both ends of the light receiving elements 23a and 23b for light amount monitoring in the radius direction are arranged to be within the width dimension, in the radius direction, of the light distribution on the surfaces of the light receiving elements 23a and 23b for light amount monitoring to which light emitted from the light source 1 and passed through the optical slit is applied (W1'>W3). In contrast, in the present embodiment, both ends of the light receiving elements 23a and 23b for light amount monitoring in the radius direction are arranged outside the width dimension, in the radius direction, of the light distribution on the surfaces of the light receiving elements 23a and 23b for light amount monitoring to which light emitted from the light source 1 and passed through the optical slit is applied (W1'<W3).

Like in the first embodiment, the present embodiment is also capable of providing a monitoring signal without being influenced by the optically non-transparent portions 52 at the rotation angle detection track 5. When nonuniformity is generated in the intensity of light emitted from the light source 1, a monitoring signal varies due to this nonuniformity on the occurrence of the deflection of the rotary slit plate 4. Thus the third embodiment is capable of providing a monitoring signal with higher stability. On the other hand, when a plurality of tracks of the similar structure are arranged outside, the structure of the first embodiment is capable of providing a monitoring signal with higher stability as a result of the influence by these tracks.

The widths of the light receiving elements 23a and 23b for light amount monitoring in the radius direction and in the circumferential direction may be set at different values according to locations (the light receiving elements 23a and 23b for light amount monitoring may have different widths). In this case, a detected monitoring signal is corrected according to an area ratio when it is subjected to computation, to thereby realize the same effect as mentioned in the description of the first embodiment.

As mentioned in the description of the first embodiment, signal outputs from the light receiving elements 21a to 21d for position monitoring may be independently detected. In this case, a width W4 of each of the light receiving elements 21a to 21d for position monitoring in the radius direction can be greater than the width W1' as shown in FIG. 9.

As an example, the following relation is established in FIG. 9:

W4>W1'

Further, the inner peripheral sides of the light receiving elements 21a to 21d for position monitoring are arranged along an inner periphery 25 (a circle indicated by a broken line in FIG. 9) of the region of the surfaces of the light receiving elements 21a to 21d for position monitoring to which light emitted from the light source 1 and passed through the optical slit (optically transparent portions 51) is applied (indicated by hatching in FIG. 9). That is, the light receiving elements 21a to 21d for position monitoring are arranged along the same circumference, whereas the light receiving elements 21a to 21d and the light receiving elements for rotation angel detection (rotation angle detection regions 22a to 22d) are not arranged on the same circumference.

In this structure, when the rotary slit plate 4 deviates in the direction of a Y axis from the light receiving elements 21a to 21d for position monitoring (light receiving element group 2), for example, a signal from the light receiving element 21c for position monitoring is lower in strength than a signal from the light receiving element 21a for position monitoring. Then it is allowed to know that the rotary slit plate 4 deviates in the direction of the Y axis to thereby realize position adjustment.

In the example of FIG. 9, the inner peripheral sides of the light receiving elements 21a to 21d for position monitoring are arranged along the inner periphery 25. Alternatively, while the relation W4>W1' is maintained, the outer peripheral sides of the light receiving elements 21a to 21d for position monitoring may be arranged along an outer periphery 26 (a circle indicated by a broken line in FIG. 9) of the region of the surfaces of the light receiving elements 21a to 21d for position monitoring to which light emitted from the light source 1 and passed through the optical slit (optically transparent portions 51) is applied (indicated by hatching in FIG. 9). In this case, the same effect is also realized.

The width W4 of each of the light receiving elements 21a to 21d for position monitoring in the radius direction may be smaller than the width W1'. In this case, like in the above-discussed cases, the outer peripheral sides or inner peripheral sides of the light receiving elements 21a to 21d for position monitoring are also arranged along the outer periphery 26 or along the inner periphery 25 of the region of the surfaces of the light receiving elements 21a to 21d for position monitoring to which light emitted from the light source and passed through the optical slit, to thereby realize the same effect.

Further, the light receiving elements 21a to 21d for position monitoring arranged at different locations may have different widths in the radius direction and in the circumferential direction. In this case, signals detected from the light receiving elements 21a to 21d for position monitoring are corrected according to an area ratio when they are subjected to computation, to thereby realize the same effect as mentioned in the description of the first embodiment.

Figure 10:
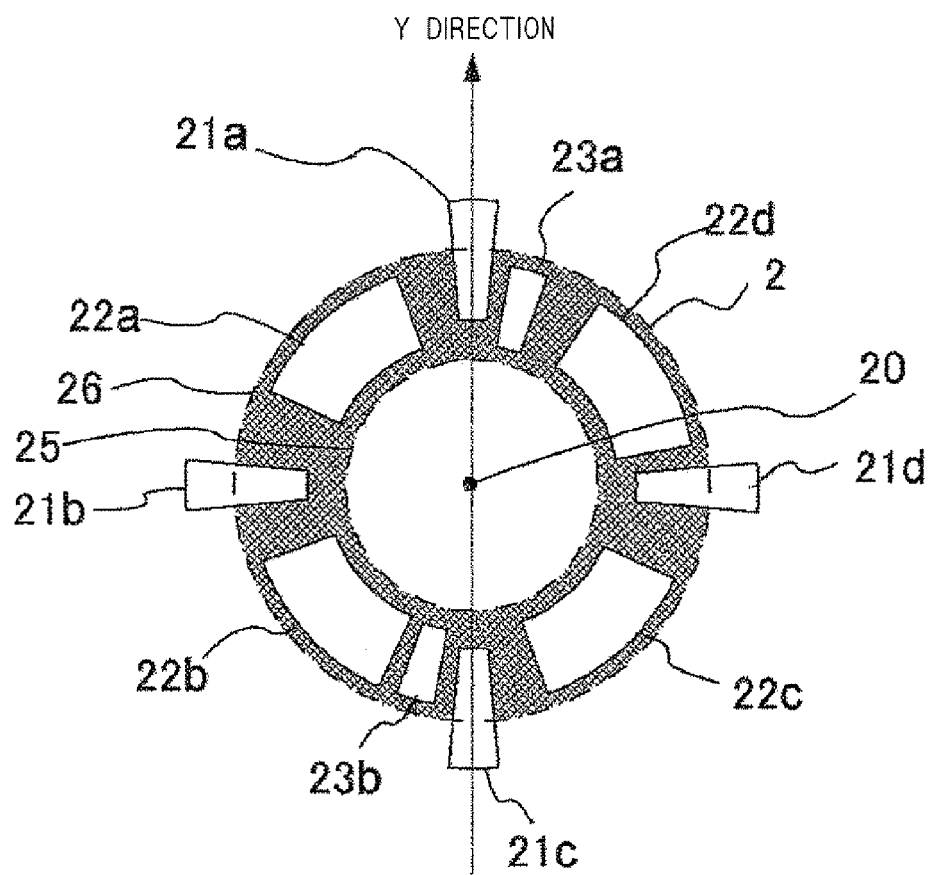
FIG. 10 is a plan view showing an alternative of the structure of the light receiving element group according to the third embodiment of the present invention.

In FIG. 9, the outer peripheral sides or the inner peripheral sides of the light receiving elements 21a to 21d for position monitoring are shown to be arranged along the outer periphery 26 or along the inner periphery 25. Alternatively, both the outer peripheral sides and the inner peripheral sides of the light receiving elements 21a to 21d for position monitoring may not be arranged along neither the outer periphery 26 nor the inner periphery 25 as shown in FIG. 10. That is, like the example shown in FIG. 9, the light receiving elements 21a to 21d for position monitoring are arranged along the same circumference, whereas the light receiving elements 21a to 21d for position monitoring and the light receiving elements for rotation angel detection (rotation angle detection regions 22a to 22d) are not arranged on the same circumference.

In this case, the optical rotary encoder of the third embodiment is adjusted so that a ratio between the strengths of signals from the light receiving elements 23a and 23b for light amount monitoring and the strengths of signals from the light receiving elements 21a to 21d for position monitoring is set to be a certain value, for example. This realizes substantially the same effect as mentioned in the description of the first embodiment, at a slightly low sensitivity level as compared to the arrangement in which the outer peripheral sides or the inner peripheral sides of the light receiving elements 21a to 21d for position monitoring are arranged along the outer periphery 26 or along the inner periphery 25.

Fourth Embodiment

Figure 11:
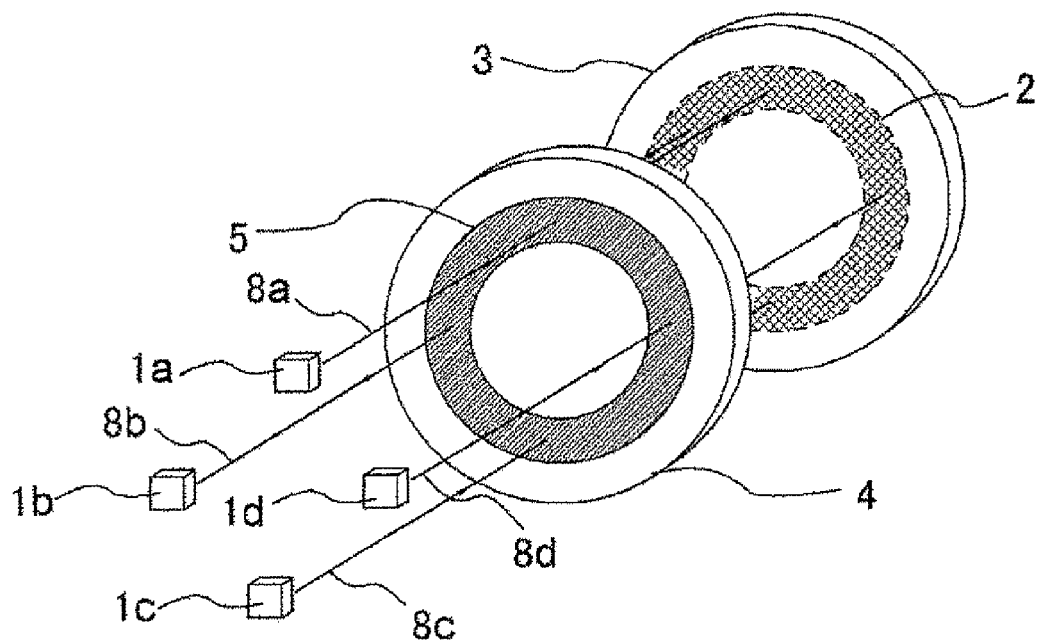
FIG. 11 is a perspective view showing the overall structure of an optical rotary encoder according to a fourth embodiment of the present invention.
Figure 12:
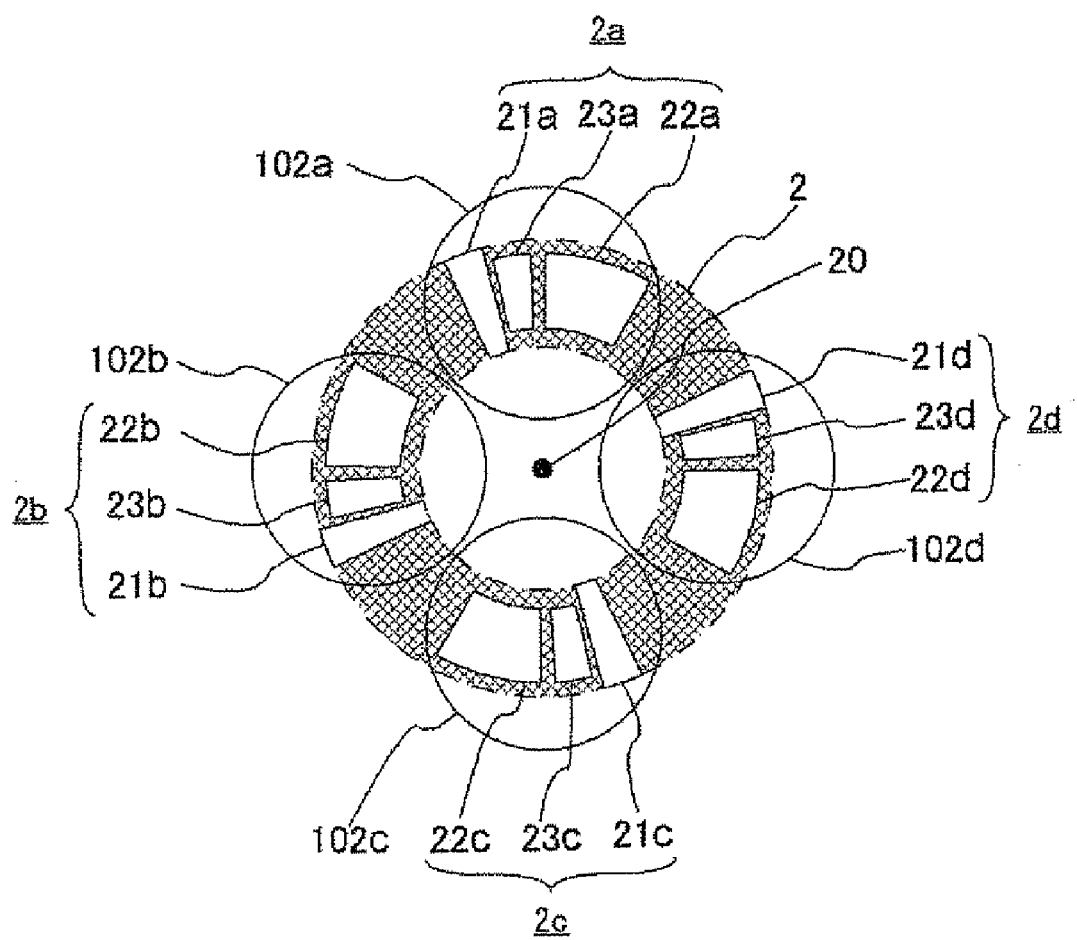
FIG. 12 is a plan view showing the structure of a light receiving element group shown in FIG. 11.

FIGS. 11 and 12 show the structure of an optical rotary encoder according to a fourth embodiment of the present invention. FIG. 11 is a perspective view of an overall structure, and FIG. 12 is a plan view of a light receiving element group. The other structures are the same as those of the first embodiment, so in the following description, the difference from the first embodiment will be mainly discussed.

Light to be applied to the optical slit of the rotary slit plate 4 does not necessary enter the entire periphery of the optical slit. As an example, lights 8a to 8d respectively emitted from light sources 1a to 1d arranged at different locations (in FIG. 11, four locations) may be each applied to a part of the optical slit of the rotary slit plate 4. Then the lights passed through the optical slit are detected by the light receiving element group 2 on the light receiver 3 to thereby realize the same effect as mentioned in the description of the first embodiment.

As seen from exemplary arrangement of the light receiving element group 2 shown in FIG. 2, in the present embodiment, light receiving element units 2a to 2d are provided that respectively include light receiving elements for rotation angle detection (shown by the rotation angle detection regions 22a to 22d in FIG. 12), light receiving elements 21a to 21d for position monitoring, and light receiving elements 23a to 23d for light amount monitoring. The light receiving element units 2a to 2d are arranged at different locations (in FIG. 12, at evenly spaced four locations) on a circumference in corresponding relationship with positions to which the lights emitted from the light sources 1a, 1b, 1c and 1d are applied (regions 102a, 102b, 102c and 102d). With the units 2a to 2d having the light receiving elements of the same structures, a light receiving element group is more suitably applicable to mass production.

The light receiving element units 2a, 2b, 2c and 2d are desirably arranged to be within the regions 102a, 102b, 102c and 102d respectively to which lights from the light sources 1a, 1b, 1c and 1d are applied. The light sources 1a, 1b, 1c and 1d desirably emit lights of the same amount. When nonuniformity is generated in the amounts of lights emitted from the light sources 1a, 1b, 1c and 1d outputs from the light receiving elements 23a to 23d for light amount monitoring respectively arranged at more than one location in the regions 102a, 102b, 102c and 102d (in FIG. 12, respectively arranged at one location in the regions 102a, 102b, 102c and 102d) may be independently detected. Then the amounts of lights emitted from the light sources 1a, 1b, 1c and 1d are controlled to be uniform to thereby provide a stable signal.

Like in the first embodiment, the light receiving elements 21a to 21d for position monitoring are arranged at four locations on the same circumference in FIG. 12. The light receiving elements are desirably arranged at several locations in corresponding relationship with regions to which lights from the light sources 1a to 1d are applied.

The width and the location in the radius direction of each of the light receiving elements 21a to 21d for position monitoring and the light receiving elements 23a to 23d for light amount monitoring are not limited to those shown in FIG. 12. The width and the location mentioned in the description of the third embodiment are also applicable.

Fifth Embodiment

Figure 13:
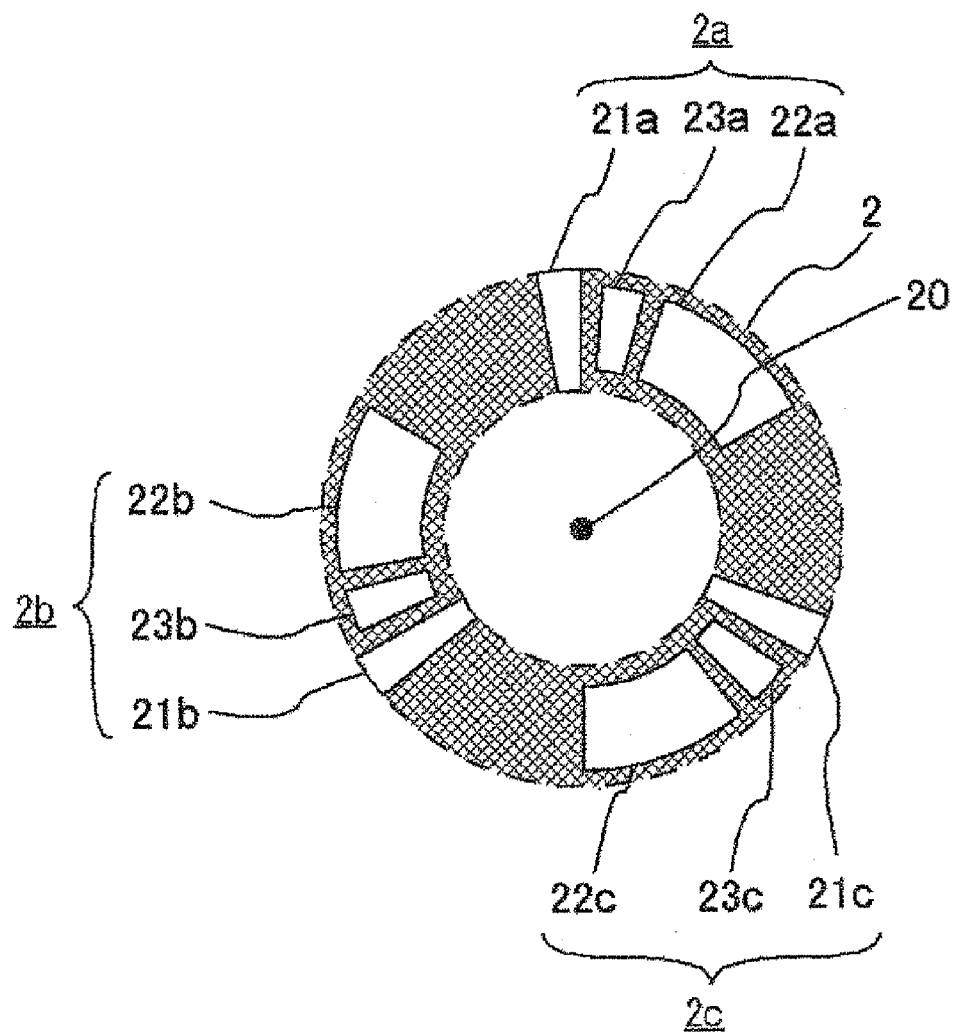
FIG. 13 is a plan view showing the structure of a light receiving element group according to a fifth embodiment of the present invention.

FIG. 13 shows the structure of an optical rotary encoder according to a fifth embodiment of the present invention. More specifically, FIG. 13 is a plan view of a light receiving element group. The other structures are the same as those of the first embodiment, so in the following description, the difference from the first embodiment will be mainly discussed.

In the present embodiment, light receiving element units 2a to 2c are provided that respectively include light receiving elements for rotation angle detection (shown by the rotation angle detection regions 22a to 22c in FIG. 13), light receiving elements 21a to 21c for position monitoring, and light receiving elements 23a to 23c for light amount monitoring. The light receiving element units 2a to 2c are arranged at different locations (in FIG. 13, at evenly spaced three locations) on a circumference in corresponding relationship with positions to which light emitted from the light source is applied. The light receiving elements for rotation angle detection (rotation angle detection regions 22a to 22c) are evenly spaced at three locations along the same circumference (shifted 120 degrees from one another with respect to the center point 20 of a circumference along which the rotation angle detection regions 22a to 22c are arranged). The light receiving elements 21a to 21c for position monitoring are evenly spaced at three locations along the same circumference (shifted 120 degrees from one another with respect to the center point 20 of a circumference along which the light receiving elements 21a to 21c for position monitoring are arranged). The light receiving elements 23a to 23c for light amount monitoring are evenly spaced at three locations along the same circumference (shifted 120 degrees from one another with respect to the center point 20 of a circumference along which the light receiving elements 23a to 23c for light amount monitoring are arranged).

With this arrangement in which the light receiving elements 23a to 23c are arranged at different locations that are not 180 degrees opposite to each other, in contrast to the case where monitoring is performed at one location, the sinusoidal variation of a light amount monitoring signal caused by an error at the stage of assembly, adjustment and the like is reduced, The light receiving elements 21a to 21c for position monitoring are arranged at different locations on the circumference, thereby realizing the same effect. That is, the position adjustment of the rotary slit plate is easily realized not only in the radius direction (in the direction of a Y axis of FIG. 3) but also in the circumferential direction (in the direction of an X axis of FIG. 3) of the rotary slit plate. Thus the positional deviation between the rotary slit plate and the light receiving elements at the stage of assembly can be minimized to thereby provide a downsized optical rotary encoder with a high degree of detection accuracy.

Here, as compared to the arrangement in which light receiving elements are arranged at locations close to one another on a circumference, the light receiving elements are desirably evenly spaced along the circumference, for example at three locations shifted 120 from one another as shown in FIG. 13. This is because the deviation in every direction between the rotary slit plate 4 (rotation angel detection track 5) and the light receiver 3 (light receiving element track) can be easily detected with a high degree of accuracy.

The width and the location in the radius direction of each of the light receiving elements 21a to 21c for position monitoring and the light receiving elements 23a to 23c for light amount monitoring are not limited to those shown in FIG. 13 The width and the location mentioned in the description of the third embodiment are also applicable.

In each of the above-described embodiments, the light receiving elements for position monitoring are arranged at different locations. Alternatively, the position of the rotary slit plate can be monitored by a light receiving element for position monitoring arranged at least at one location.

Sixth Embodiment

Figure 14:
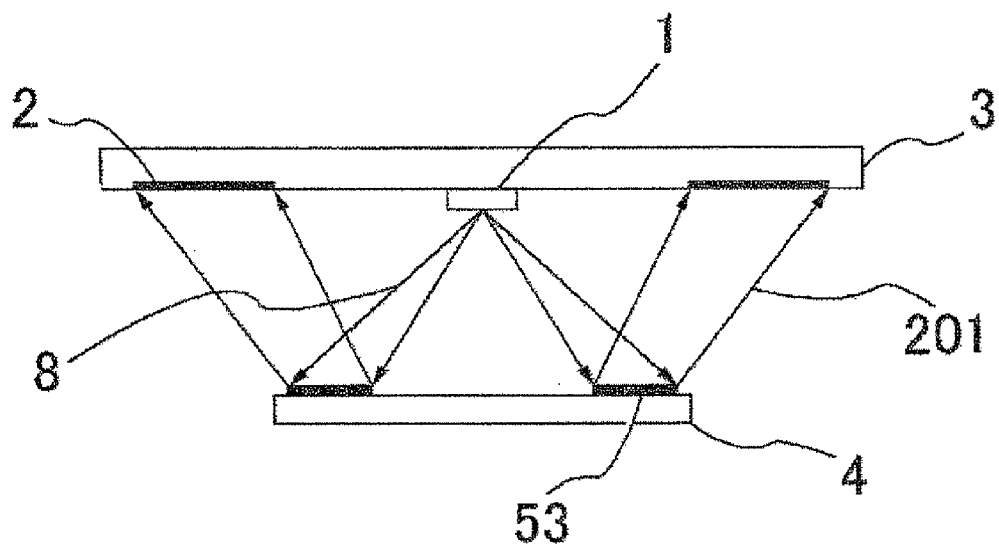
FIG. 14 is a sectional view showing the overall structure of an optical rotary encoder according to a sixth embodiment of the present invention.

FIG. 14 is a sectional view showing the overall structure of an optical rotary encoder according to a sixth embodiment of the present invention. In the first embodiment, the return-type optical system using the optical slit of optically transparent type is applied as shown in FIG. 1. According to the present embodiment, a return-type optical system using a reflective optical slit is applied in which light 8 emitted from the light source 1 is reflected by a reflective portion 53 on the rotary slit plate 4. Reflected light 201 thereby formed is received by the light receiving element group 2 to be subjected to photoelectric conversion.

In the optical rotary encoder applying an optical system of this structure, light receiving elements for rotation angle detection, light receiving elements for position monitoring, and light receiving elements for light amount monitoring are arranged in a manner similar to that mentioned in each of the embodiments described above, to thereby realize the same effect.

In each of the embodiments described above, light receiving elements for position monitoring are arranged in corresponding relationship with positions to which light emitted from a light source and passed through an optical slit is applied, so that the light emitted from the light source is received through the optical slit by the light receiving elements for position monitoring. Further, a rotation angle detection track is also operative to function as a position monitoring track. Alternatively, an optical slit for position monitoring and the rotation angle detection track may be independently provided. Still alternatively, the positional relationship between a rotary slit plate and a light receiver may be optically adjusted using a microscope without the presence of the light receiving elements for position monitoring.

The invention claimed is:

1. An optical rotary encoder, comprising:
a rotary slit plate having a rotation angle detection track including an optical slit;
a light source for applying light to said optical slit;
light receiving elements for rotation angle detection arranged in corresponding relationship with positions to which light emitted from said light source is applied to said optical slit, thereby receiving the light emitted from said light source and passing through said optical slit; and
first and second light receiving elements for light amount monitoring arranged at respective locations on a circumference in corresponding relationship with positions at which light emitted from said light source is applied to said optical slit, and receiving the light emitted from said light source and passing through said optical slit, wherein
each of said first and second light receiving elements for light amount monitoring has an angular width that is an integer multiple of an angular interval of light intensity distribution, on surfaces of said first and second light receiving elements for light amount monitoring, of the light emitted from said light source and that has passed through said optical slit, and
said first and second light receiving elements for light amount monitoring are arranged on a circumference in corresponding relationship with positions at which the light emitted from said light source is applied to said optical slit, and said first and second light receiving elements for light amount monitoring are located 180 degrees from each other with respect to a center point of the circumference, thereby reducing variations of signals from said first and second light receiving elements for light amount monitoring that are caused by deviations of the light intensity distribution and deviations of said first and second light receiving elements for light amount monitoring in a radial direction with respect to a center of said rotary slit plate.

2. The optical rotary encoder according to claim 1, wherein first and second ends of said first and second light receiving elements for light amount monitoring, in the radial directions, are arranged within a width dimension, in the radial direction, of light emitted from said light source and that has passed through said optical slit in a distribution of the light incident on surfaces of said first and second light receiving elements for light amount monitoring.

3. The optical rotary encoder according to claim 1, including third and fourth light receiving elements for light amount monitoring arranged on a circumference in corresponding relationship with positions at which light emitted from said light source is applied to said optical slit, wherein said third and fourth light receiving elements for light amount monitoring are spaced at an interval of $(2n+\frac{1}{2})$ of the angular interval of the light intensity distribution, wherein n is zero or an integer.

4. The optical rotary encoder according to claim 3, wherein each of said third and fourth light receiving elements for light amount monitoring has an angular width that is an integer multiple of the angular interval of light intensity distribution, on surfaces of said third and fourth light receiving elements for light amount monitoring, of the light emitted from said light source and that has passed through said optical slit.

5. The optical rotary encoder according to claim 3, wherein each of said third and fourth light receiving elements for light amount monitoring has an angular width that is an integer multiple, larger than one, of the angular interval of light intensity distribution, on surfaces of said third and fourth light receiving elements for light amount monitoring, of the light emitted from said light source and that has passed through said optical slit.

6. The optical rotary encoder according to claim 1, wherein first and second ends of said first and second light receiving elements for light amount monitoring, in the radial direction, are arranged outside a width dimension, in the radial direction, of light emitted from said light source and that has passed through said optical slit in a distribution of the light incident on surfaces of said first and second light receiving elements for light amount monitoring.

7. The optical rotary encoder according to claim 1, wherein each of said first and second light receiving elements for light amount monitoring has an angular width that is an integer multiple, larger than one, of the angular interval of the light intensity distribution on the surfaces of said first and second light receiving elements for light amount monitoring, of the light emitted from said light source and that has passed through said optical slit.

* * * * *